J. C. CARPENTER.
FLUID CLUTCH.
APPLICATION FILED JAN. 8, 1912.

1,031,621.

Patented July 2, 1912.

2 SHEETS—SHEET 1.

WITNESSES:

INVENTOR
John C. Carpenter.
BY
Hardway & Cathy
ATTORNEYS.

J. C. CARPENTER.
FLUID CLUTCH.
APPLICATION FILED JAN. 8, 1912.

1,031,621.

Patented July 2, 1912.
2 SHEETS—SHEET 2.

WITNESSES:
May Montgomery
Sophie Sigel

INVENTOR
John C. Carpenter
BY
Hardway & Cathy
ATTORNEY's.

UNITED STATES PATENT OFFICE.

JOHN C. CARPENTER, OF HOUSTON HEIGHTS, TEXAS.

FLUID-CLUTCH.

1,031,621. Specification of Letters Patent. Patented July 2, 1912.

Application filed January 8, 1912. Serial No. 670,015.

*To all whom it may concern:*

Be it known that I, JOHN C. CARPENTER, a citizen of the United States, residing at Houston Heights, in the county of Harris and State of Texas, have invented certain new and useful Improvements in Fluid-Clutches, of which the following is a specification.

My invention relates to new and useful improvements in fluid clutches and belongs to that class of power transmission mechanism wherein a relatively rotating cylinder and piston, having an annular working chamber therebetween, and having a common axis of rotation, each carry abutments normally blocking said working chamber and adapted to compress or expand a working fluid, in said chamber, upon the relative rotation of said cylinder and piston.

The object of the invention is to produce a clutch, of the character described, which will possess great power and at the same time be light and durable, and capable of being readily declutched and also gradually engaged so as to transmit any part or all of the power of the prime mover without shock or jar and without the frictional loss common to friction clutches.

Another object of the invention resides in the provision of a simple and effective mechanism whereby the clutch members may be readily clutched with and declutched from each other.

A further object of the invention resides in the provision of a simple and effective mechanism whereby oil is replaced in the working chamber after having been forced or drained out.

With the above and other objects in view, my invention has particular relation to certain novel features of construction, and operation, hereinafter described in this specification and illustrated in the accompanying drawings, which are made a part hereof, wherein:—

Figure 1:
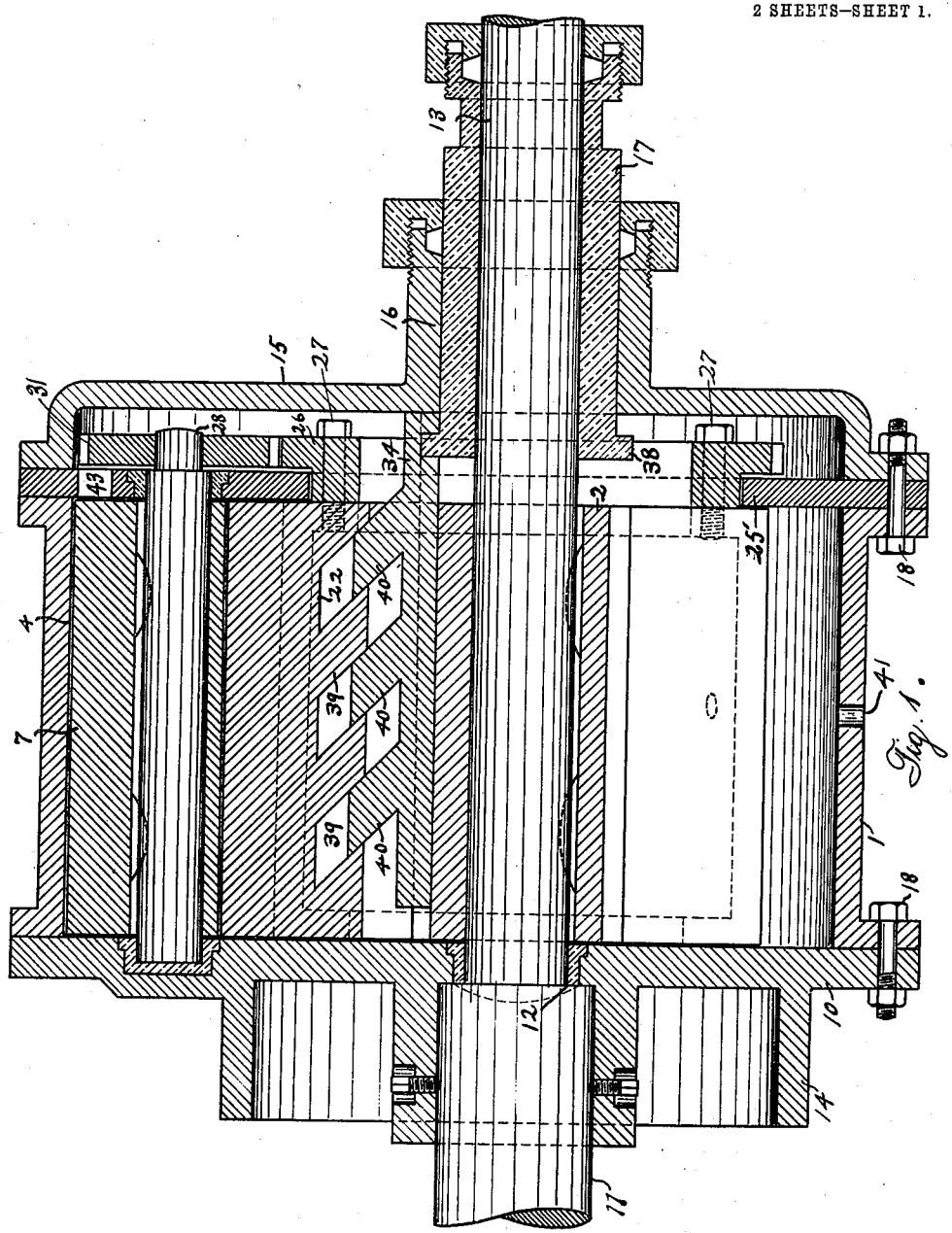
Figure 2:
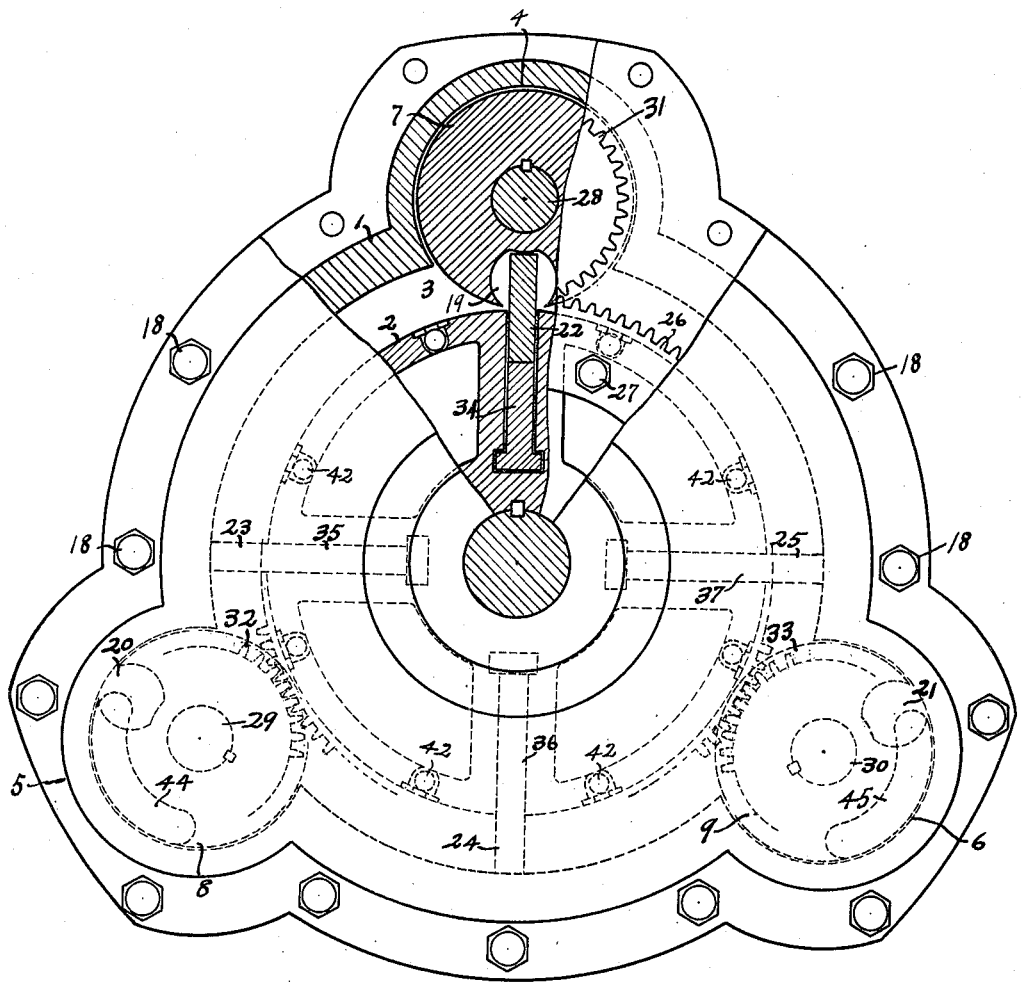

Figure 1 is a sectional side elevation of my device, and Fig. 2 is an end view thereof, with a portion of the end casing broken away so as to expose the working mechanism, a portion of which is shown in section.

Referring now more particularly to the drawings, wherein like numerals of reference designate similar parts in each of the figures, the numeral 1 designates a cylinder and the numeral 2 refers to a circular piston having the same axis of rotation as said cylinder.

The numeral 3 refers to an annular working chamber between the cylinder wall and the periphery of the piston.

The numerals 4, 5 and 6, respectively, refer to cylindrical recesses in the cylinder wall, provided for the purpose of receiving rotary abutments 7, 8 and 9, which are in peripheral contact with the piston 2.

The numeral 10 refers to an end plate to cylinder 1, fixed upon the driven shaft 11, and provided with a bearing 12 for the driving shaft 13, upon which the piston 2 is rigidly mounted.

The numeral 14 refers to an annular flange which projects outwardly from the outer side of plate 10, and which may be utilized as a brake surface for the brake in case one is used in connection with the mechanism. The other end of the cylinder 1 is inclosed by an end plate 15, which is provided with bearing 16, in which the sliding sleeve 17 is mounted. This sleeve serves as a supporting bearing for the shaft 13. The cylinder 1 and the end plates 10 and 15 are secured together by means of bolts 18, forming a reservoir for the oil used as a lubricant and working fluid. The rotary abutments 7, 8 and 9 are each provided with a peripheral pocket, designated, respectively, by the numerals 19, 20 and 21. These pockets are adapted to register with sliding piston abutments, or valves, 22, 23, 24 and 25, which are carried by the piston 2. These valves extend from end to end of the annular working chamber and may be projected from the piston 2 so as to span said chamber, or may be withdrawn into said piston by means of a mechanism hereinafter to be described.

The numeral 25′ designates an annular partition plate, which is secured between the end plate 15 and the cylinder 1, and projects across the annular working chamber 3, and rests against the end of the piston 2 and rotary abutments 7, 8 and 9. Said annular working chamber comprises the space between the cylinder 1, the piston 2, the end plate 10 and the partition plate 25′.

Secured upon the end of the piston 2 is the master gear 26, whose inner side fits closely against said piston and is flush with the inner side of plate 25′. This gear is considerably thicker than said plate, and its periphery fits closely against the inner edge thereof, and its gear teeth overlap the plate 25'. This gear is secured upon the piston 2 by means of bolts 27.

The rotary abutments 7, 8 and 9 are fixed upon the shafts 28, 29 and 30, respectively, which rotate in suitable bearings in the end plate 10 and the partition plate 25', and these shafts project beyond said partition plate and carry spur gears 31, 32 and 33, which are keyed thereon so as to rotate therewith, and which mesh with the master gear 26. As said master gear rotates, a relative rotation is imparted to the rotary abutments 7, 8 and 9, through said gears 31, 32 and 33.

The piston is provided with four lengthwise radially extending slots, arranged a uniform distance apart around said piston, in which slots the valves 22, 23, 24 and 25 snugly fit, and in which said valves are adapted to move radially back and forth. Within the slots and behind the valves are the respective valve shifters 34, 35, 36 and 37, whose inner edges are provided with laterally extending lengthwise flanges which dovetail into corresponding lengthwise T recesses formed by the enlargement of the inner sides of said slots, and so cause the said valve shifters to interlock with the piston and allow only an axial movement of said valve shifters 34, 35, 36 and 37. The valve shifters are limited in their axial movement by the end plates 10 and 15, the latter serving as a stop to limit the outward movement of the valves. The inner end of sliding sleeve 17 is provided with an annular shoulder 38 which fits into corresponding notches in the inner side of the outer end of the valve shifters 34, 35, 36 and 37, as shown in Fig. 1, and as the sleeve 17 is manipulated along the shaft 13 a corresponding movement is imparted to said valve shifters. The inner edges of the valves 22, 23, 24 and 25 are provided with inclined projections 39 which alternate between and bear upon similar inclined projections 40 extending outwardly from the valve shifters 34, 35, 36 and 37, and as the valve shifters are reciprocated back and forth axially through the operation of the sleeve 17, they operate wedgewise upon the valves and cause them to be projected from or withdrawn into the piston 2. The valves are forced to operate radially by reason of their bearing upon the plates 10 and 25', and at right angles to the direction of movement of the valve shifters, which operate axially.

It will be noted that the pitch diameter of the master gear 26 is greater than the diameter of the piston 2, but less than the mean diameter of the annular working chamber 3, so that the entrance to the peripheral pockets 19, 20 and 21 may be made smaller than if the pitch diameter of the gear 26 were the same or greater than the mean diameter of the piston 2. By this construction the peripheral pockets may be made more nearly cylindrical and leave a great portion of the periphery of the rotary abutments to come in contact with the piston 2. By this construction, also, the periphery of the piston 2 travels almost as rapidly as the periphery of the rotary abutments 7, 8 and 9, and rolling contact is more nearly approximated.

The annular working chamber is filled with a heavy oil through a suitable opening, as 41, in the cylinder. When so filled, and the valves are projected from the piston so as to span the working chamber, it is readily obvious that the driving and driven members will be fully clutched and forced to rotate together, and the incompressibility of the oil will render the clutch positive in its clutching effect, slipping only as the oil may be forced past either abutment or past the edge of the piston. Between these two extremes the clutching effect may be varied at the will of the operator, the clutch transmitting all of the power of the driving member to the driven member, the product of the torque and rotative speed of the driving member being equal to the product of the torque and rotative speed of the driven member. The speed of the vehicle, upon which this clutch is used, may be varied by the clutch through the entire range from zero to direct drive from the engine. It is obvious that, by slipping the clutch, the torque of the driven member will be increased relative to the torque of the driving member.

When the engine is running and the driving member is rotating, if the valves are withdrawn into the piston, the cylinder will offer no resistance, except surface friction, to the rotation of the piston. When the valves are forced out beyond the periphery of the piston, they impinge against the oil and force the oil against the rotary abutments, tending to cause rotation of the cylinder, and when the valves contact with the cylinder wall, the oil trapped between said valves and the rotary abutments is compressed until the cylinder is forced to rotate, by means of said compression, in harmony with the piston, and the cylinder rotation is transmitted to the driven shaft 13 and thence to the mechanism to be driven thereby.

As will be observed by an inspection of Fig. 2, the piston is substantially a hollow cylindrical body, secured upon shaft 13 by means of a hub, and having four radiating spokes, each of which accommodates a radial valve slot. I have provided in the rim of the piston, on each side of each of the spokes, ball check valves which control corresponding ports in the rim of the piston, communicating with the working chamber and the internal chambers of the piston. These piston chambers are filled with oil and also receive oil as it is forced past the edges of the piston by compression in the working chamber. As the valves compress the oil in the working chamber the check valves close their respective ports, but when the valves have registered with the peripheral pockets and have passed on, a partial vacuum is formed behind them, both in the working chamber and in the peripheral pockets. This partial vacuum will tend to lift the ball and thereby open the valve so that oil may be drawn into the working chamber from the interior of the piston.

The plate 25' is provided with three arcuate openings 43, 44 and 45, one over each of the rotary abutments and in the path of the respective peripheral pockets 19, 20 and 21, to provide for the free passage of the oil into said pockets from the space between the plate 25' and the end plate 15, the oil being thrown by centrifugal force into these recesses. The partial vacuum, formed as aforesaid, will exist in the peripheral pockets until the peripheral pockets register with the arcuate openings 43, 44 and 45, when oil will be drawn through the openings 43, 44 and 45 into the peripheral pockets 19, 20 and 21.

It will be noted that the valves 22, 23, 24 and 25 operate radially between end plate 10 and partition plate 25', that the valve shifters 34, 35, 36 and 37 operate axially in the bottom of the radial slots in piston 2, and are held against radial movement by the lateral flanges on the inner edges of the said valve shifters, that the valves and valve shifters engage wedgewise, that the sleeve 17 operates axially, and has an outwardly projecting shoulder or flange which fits into a notch on the inner edge of each of the valve shifters. This construction is adopted so that the piston, the valves, the valve shifters and the sliding sleeve may be assembled without the use of bolts, pins or other devices, and the whole held in proper relation by the plate 10 and the partition plate 25' when securely bolted to the casing
1. By this means great durability is attained and the number of parts reduced to the minimum.

Various modifications may be made without departing from the spirit of my invention, and I do not wish to be limited by the form shown.

What I claim is:

1. In a fluid clutch, the combination with two relatively rotatable members, having a working chamber therebetween, one of said members being provided with a slot; of a valve carried by said member and sliding in said slot and arranged to block and unblock said working chamber; a valve shifter operating in said slot and shifting said valve, and having one face operating upon said valve-carrying member and another operating upon said valve, the said faces of said valve shifter being inclined toward each other so that the said valve shifter shall operate upon said valve in the manner of a wedge and operate said valve; a rotary abutment carried by the other of said members and normally blocking said working chamber and provided with a peripheral pocket to permit the passage of said valve; means for rotating said rotary abutment relative to the valve-carrying member so as to cause said valve and pocket to register; and a means for regulating the operation of said valve shifter.

2. In a fluid clutch, the combination with two relatively rotatable members, having a working chamber therebetween, one of said members being provided with a slot; of a valve carried by said member and sliding in said slot and arranged to block and unblock said working chamber; a valve shifter operating in said slot and shifting said valve, and having one face operating upon said valve carrying member and another operating upon said valve, the said faces of said valve shifter being inclined toward each other so that the said valve shifter shall operate upon said valve in the manner of a wedge and operate said valve in a direction at an angle to the direction of movement of said valve shifter; a rotary abutment carried by the other of said members and normally blocking said working chamber, but provided with a peripheral pocket to permit the passage of said valve; means for rotating said rotary abutment relative to the valve-carrying member so as to cause said valve and pocket to register; and a means for regulating the operation of said valve shifter.

3. In a fluid clutch, the combination with two relatively rotatable members, having a working chamber therebetween and having a common axis of rotation, one of said members being provided with a slot; of a valve carried by said member and sliding in said slot and arranged to block and unblock said working chamber; a valve shifter operating in said slot and shifting said valve, and having one face coöperating with said valve-carrying member as with a guide and another coöperating with said valve, the said operative faces of said valve shifter being inclined toward each other so that the said valve shifter shall operate upon the said valve in the manner of a wedge and operate said valve; a rotary abutment carried by the other of said members and normally blocking said working chamber, but provided with a peripheral pocket to permit the passage of said valve; means for rotating said rotary abutment relative to the valve-carrying member so as to cause said valve and pocket to register; and a means for regulating the operation of said valve shifter.

4. In a fluid clutch, the combination with two relatively rotatable members, having a working chamber therebetween, one of said members being provided with a slot; of a valve carried by said member and sliding in said slot and arranged to block and unblock said working chamber; a valve shifter operating in said slot and shifting said valve, and having one face coöperating with said valve-carrying member as with a guide and another operating upon said valve, the said operative face of said valve being inclined to the direction of movement of said valve.

5. In a fluid clutch, the combination with two relatively rotatable members, having a working chamber therebetween, one of said members being provided with a slot; of a valve sliding in said slot and arranged to block and unblock said working chamber; a valve actuating means for operating said valve, said valve actuating means being provided with a projection, inclined to its direction of movement, which projection operates upon said valve; a rotary abutment carried by the other of said members and normally blocking said working chamber, but provided with a peripheral pocket to permit the passage of said valve; means for rotating said rotary abutment relative to the valve-carrying member so as to cause said valve and pocket to register; and a means for regulating the operation of said valve actuating means.

6. In a fluid clutch, the combination with two relatively rotatable members, having a working chamber therebetween, one of said members being provided with a slot; of a valve sliding in said slot and arranged to block and unblock said working chamber; a valve actuating means for operating said valve, one of the two last mentioned elements being provided with a projection, inclined to its direction of movement, which projection engages with the other of said elements and operates thereupon in the manner of a wedge; a rotary abutment carried by the other of said members and normally blocking said working chamber, but provided with a peripheral pocket to permit the passage of said valve; means for rotating said rotary abutment relative to the valve-carrying member so as to cause said valve and pocket to register; and a means for regulating the operation of said valve actuating means.

7. In a fluid clutch, the combination with two relatively rotatable members, having a working chamber therebetween, one of said members being provided with a slot; of a valve sliding in said slot and arranged to block and unblock said working chamber; a valve shifter operating in said slot and shifting said valve, one of the two last mentioned elements having a projection inclined to its direction of movement and operating wedgewise upon the other of said elements; a rotary abutment carried by the other of said members and normally blocking said working chamber, but provided with a peripheral pocket to permit the passage of said valve; means for rotating said rotary abutment relative to the valve-carrying member so as to cause said valve and pocket to register; and a means for regulating the operation of said valve shifter.

8. In a fluid clutch, the combination with two relatively rotatable members, having a working chamber therebetween, one of said members being provided with a radial slot; of a valve sliding radially in said slot and arranged to block and unblock said working chamber; a valve shifter sliding axially in said slot and operating said valve, one of the two last mentioned elements having a projection inclined to its direction of movement and operating wedgewise upon the other of said elements; a rotary abutment carried by the other of said members and normally blocking said working chamber, but provided with a peripheral pocket to permit the passage of said valve; means for rotating said rotary abutment relative to the valve-carrying member so as to cause said valve and pocket to register; and a means for regulating the operation of said valve shifter.

9. In a fluid clutch, the combination with two relatively rotatable members, having a working chamber therebetween, one of said members being provided with a slot; of a valve sliding in said slot and arranged to block and unblock said working chamber; a valve shifter operating in said slot and shifting said valve, one of the two last mentioned elements engaging a slot in the other element, said slot being inclined to the direction of movement of the last mentioned element; a rotary abutment carried by the other of said members and normally blocking said working chamber, and provided with a peripheral pocket to permit the passage of said valve; means for rotating said rotary abutment relative to the valve-carrying member so as to cause said valve and pocket to register; and a means for regulating the operation of said valve shifter.

10. In a fluid clutch, the combination with a rotary piston and a rotary casing, having a working chamber therebetween, said piston being provided with a radial slot extending lengthwise thereof; of a valve sliding radially in said slot and arranged to block and unblock said working chamber; an axially sliding valve shifter operating in said slot behind said valve and operating said valve, one of the two last mentioned elements having a projection inclined to its direction of movement and operating wedgewise upon the other of said elements; a rotary abutment carried by the casing and normally blocking said working chamber, but provided with a peripheral pocket to permit the passage of said valve; means for rotating said rotary abutment relative to the rotary piston so as to cause said valve and pocket to register; and means for regulating the operation of said valve shifter.

11. In a fluid clutch, the combination with a rotary piston and a rotary casing, having a working chamber therebetween, said piston being provided with a radial slot extending lengthwise thereof; of a valve sliding radially in said slot and arranged to block and unblock said working chamber; a valve shifter sliding axially in said slot behind said valve, but interlocked with said piston by means of a laterally extending flange carried by said valve shifter and engaging a corresponding groove in said piston, said valve shifter being provided with a projection, inclined to its direction of movement, which projection engages with and operates said valve; a rotary abutment carried by the casing and normally blocking said working chamber, but provided with a peripheral pocket to permit the passage of said valve; means for rotating said rotary abutment relative to the rotary piston so as to cause said valve and pocket to register; and means for regulating the operation of said valve shifter.

12. In a fluid clutch, the combination with a rotary piston and a rotary casing, having a working chamber therebetween, said piston being provided with a slot; of a valve sliding in said slot and arranged to block and unblock said working chamber; a valve shifter sliding axially in said slot and operating said valve; an axially sliding sleeve having operative engagement with said valve shifter and operating the same; means for regulating the operation of said sleeve; a rotary abutment carried by said casing and normally blocking said working chamber, but provided with a peripheral pocket to permit the passage of said valve; and means for rotating said rotary abutment relative to the rotary piston so as to cause said valve and pocket to register.

13. In a fluid clutch, the combination with a rotary piston and a rotary casing, having a working chamber therebetween; said piston being provided with a slot; of a valve sliding in said slot and arranged to block and unblock said working chamber; a valve shifter sliding axially in said slot behind said valve, but interlocked with said piston by means of a laterally extending flange carried by said valve shifter and engaging a corresponding groove in said piston, said valve shifter being provided with a projection, inclined to its direction of movement, which projection engages with and operates said valve; an axially sliding sleeve having operative engagement with said valve shifter by means of an outwardly extending flange carried by said sleeve and engaging with an outwardly extending notch in said valve shifter and operating said valve shifter; means for regulating the operation of said sleeve; a rotary abutment carried by said casing and normally blocking said working chamber, but provided with a peripheral pocket to permit the passage of said valve; and means for rotating said rotary abutment relative to the rotary piston so as to cause said valve and pocket to register.

14. In a fluid clutch, the combination with a casing and a rotary piston, having a working chamber therebetween; of a valve carried by one of said members and arranged to block and unblock said working chamber; a rotary abutment carried by the other of said members and normally blocking said working chamber, and provided with a peripheral pocket to permit the passage of said valve; means for rotating said rotary abutment relative to the valve-carrying member so as to cause said valve and pocket to register; means for regulating the operation of said valve; and a plate within said casing and resting against one end of said rotary abutment, and having a port therethrough arranged in the path of said peripheral pocket, so as to register therewith.

15. In a fluid clutch, the combination with a casing and a rotary piston, having a working chamber therebetween, said piston having a port in the rim thereof connecting said working chamber with the interior of said piston; a valve for said port; a valve carried by one of said members and arranged to block and unblock said working chamber; and means for regulating the operation of said valve; a rotary abutment carried by said casing and normally blocking said working chamber, but provided with a peripheral pocket to permit the passage of said valve; and means for rotating said rotary abutment relative to the rotary piston so as to cause said valve and pocket to register.

16. In a fluid clutch, the combination with a casing and a rotary piston, having a working chamber therebetween and provided with a fluid reservoir adjacent to said working chamber, said working chamber being provided with a port in the wall thereof, connecting said working chamber with said reservoir; a valve for said port; a valve carried by one of said members and arranged to block and unblock said working chamber; and a means for regulating the operation of said valve; a rotary abutment carried by said casing and normally blocking said working chamber, but provided with a peripheral pocket to permit the passage of said valve; and means for rotating said rotary abutment relative to the rotary piston so as to cause said valve and pocket to register.

17. In a fluid clutch, the combination with a casing and a rotary piston, having a working chamber therebetween, said piston having a port in the rim thereof connecting said working chamber with the interior of said piston; a valve carried by one of said first mentioned members and arranged to block and unblock said working chamber; means for regulating the operation of said valve; a rotary abutment carried by the other of said first mentioned members and normally blocking said working chamber, but provided with a peripheral pocket to permit the passage of said valve; and means for rotating said rotary abutment relative to the rotary piston so as to cause said valve and pocket to register.

18. In a fluid clutch, the combination with a casing and a rotary piston, having a working chamber therebetween, and provided with a fluid reservoir adjacent to said working chamber, said working chamber being provided with a port in the wall thereof, connecting said working chamber with said reservoir; a valve carried by one of said first mentioned members and arranged to block and unblock said working chamber; a means for regulating the operation of said valve, a rotary abutment carried by the other of said first mentioned members and normally blocking said working chamber, but provided with a peripheral pocket to permit the passage of said valve; and means for rotating said rotary abutment relative to the rotary piston so as to cause said valve and pocket to register.

In testimony whereof I have signed my name to this specification in the presence of two subscribing witnesses.

JOHN C. CARPENTER.

Witnesses:
J. W. YEAGLEY,
MAY MONTGOMERY.